US012413737B2

(12) United States Patent
Panusopone et al.

(10) Patent No.: US 12,413,737 B2
(45) Date of Patent: Sep. 9, 2025

(54) GEOMETRIC PARTITIONING MERGE MODE WITH MERGE MODE WITH MOTION VECTOR DIFFERENCE

(71) Applicant: Nokia Technologies Oy, Espoo (FI)

(72) Inventors: Krit Panusopone, San Diego, CA (US); Seungwook Hong, San Diego, CA (US); Limin Wang, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 65 days.

(21) Appl. No.: 17/914,875

(22) PCT Filed: Mar. 25, 2021

(86) PCT No.: PCT/EP2021/057679
§ 371 (c)(1),
(2) Date: Sep. 27, 2022

(87) PCT Pub. No.: WO2021/197992
PCT Pub. Date: Oct. 7, 2021

(65) Prior Publication Data
US 2023/0144567 A1    May 11, 2023

Related U.S. Application Data

(60) Provisional application No. 63/004,663, filed on Apr. 3, 2020.

(51) Int. Cl.
*H04N 19/137* (2014.01)
*H04N 19/159* (2014.01)
*H04N 19/46* (2014.01)

(52) U.S. Cl.
CPC ......... *H04N 19/137* (2014.11); *H04N 19/159* (2014.11); *H04N 19/46* (2014.11)

(58) Field of Classification Search
CPC .... H04N 19/176; H04N 19/52; H04N 19/119; H04N 19/46; H04N 19/70; H04N 19/117; H04N 19/12; H04N 19/172; H04N 19/174
(Continued)

(56) References Cited

U.S. PATENT DOCUMENTS 11,122,266 B2 *   9/2021   Zhang ................. H04N 19/521
2013/0208982 A1    8/2013   Bordes et al.
(Continued)

FOREIGN PATENT DOCUMENTS

CN      103069802 A     4/2013
JP      2002312796 A    10/2002

OTHER PUBLICATIONS

Benjamin et al. ("Versatile Video Coding (Draft 7)", Joint Video Experts Team (JVET) of ITU-T SG 16 WP 3 and ISO/IEC JTC 1/SC 29/WG 11 16th Meeting: Geneva, CH, Oct. 1-11, 2019) (Year: 2019).*

(Continued)

*Primary Examiner* — Masum Billah
(74) *Attorney, Agent, or Firm* — McCarter & English, LLP

(57) ABSTRACT

A method, apparatus, and computer program product provide for improving prediction accuracy of a geometric partitioning merge mode. In the context of a method, the method accesses a coding unit partitioned into a first partition and a second partition. The method also determines whether an enabling value associated with the coding unit is indicative of additional motion vector refinement and, in accordance with a determination that the enabling value associated with the coding unit is indicative of additional motion vector refinement, determines at least one motion vector difference value for at least one partition of the first (Continued)

partition and the second partition. The method additionally applies a prediction of the coding unit in accordance with the at least one motion vector difference value.

21 Claims, 4 Drawing Sheets

(58) Field of Classification Search
USPC .......................................................... 375/240
See application file for complete search history.

(56) References Cited

U.S. PATENT DOCUMENTS

| | | | |
|---|---|---|---|
| 2022/0286689 A1* | 9/2022 | Nam | H04N 19/54 |
| 2022/0321894 A1* | 10/2022 | Lee | H04N 19/105 |
| 2023/0085937 A1* | 3/2023 | Deshpande | H04N 19/70 |

OTHER PUBLICATIONS

Zhang, K. et al., "Non-CE4: Triangular prediction mode with motion vector difference," Joint Video Experts Team (JVET) of ITU-T SG 16 WP 3 and ISO/IEC JTC 1/SC 29/WG 11, JVET-Q0315, 17$^{th}$ Meeting: Brussels, BE, Jan. 7-17, 2020.

Bross, B. et al., "Versatile Video Coding (Draft 8)," Joint Video Experts Team (JVET) of ITU-T SG 16 WP 3 and ISO/IEC JTC 1/SC 29/WG 11, JVET-Q2001-vE, 17$^{th}$ Meeting: Brussels, BE, Jan. 7-17, 2020.

Panusopone, K. et al., "GEO with MMVD," Joint Video Experts Team (JVET) of ITU-T SG 16 WP 3 and ISO/IEC JTC 1/SC 29/WG 11, JVET-R0282-r3, 18$^{th}$ Meeting, Apr. 15-24, 2020.

Bross, Benjamin, et al., "Versatile Video Coding (Draft 7)", Joint Video Experts Team (JVET) of ITU-T SG 16 WP 3 and ISO/IEC JTC 1/SC 29/WG11, Document: JVET-P2001-vE, Oct. 2019, 493 pages.

* cited by examiner

Derivation process for geometric partitioning mode motion vector components and reference indices

General

Inputs to this process are:
- a luma location ( xCb, yCb ) of the top-left sample of the current luma coding block relative to the top-left luma sample of the current picture,
- a variable cbWidth specifying the width of the current coding block in luma samples,
- a variable cbHeight specifying the height of the current coding block in luma samples.

Outputs of this process are:
- the luma motion vectors in 1/16 fractional-sample accuracy mvA and mvB,
- the chroma motion vectors in 1/32 fractional-sample accuracy mvCA and mvCB,
- the reference indices refIdxA and refIdxB,
- the prediction list flags predListFlagA and predListFlagB.

The derivation process for luma motion vectors for geometric partitioning merge mode as specified in clause 8.5.4.2a is invoked with the luma location ( xCb, yCb ), the variables cbWidth and cbHeight as inputs, and the output being the luma motion vectors mvA, mvB, the reference indices refIdxA, refIdxB and the prediction list flags predListFlagA and predListFlagB.

The derivation process for chroma motion vectors in clause 8.5.2.13 is invoked with mvA as input, and the output being mvCA.

The derivation process for chroma motion vectors in clause 8.5.2.13 is invoked with mvB as input, and the output being mvCB.

Derivation process for luma motion vectors for geometric partitioning merge mode with MVD This process is only invoked when MergeGpmFlag[ xCb ][ yCb ] is equal to 1, where ( xCb, yCb ) specify the top-left sample of the current luma coding block relative to the top-left luma sample of the current picture.

Inputs to this process are:
- a luma location ( xCb, yCb ) of the top-left sample of the current luma coding block relative to the top-left luma sample of the current picture,
- a variable cbWidth specifying the width of the current coding block in luma samples,
- a variable cbHeight specifying the height of the current coding block in luma samples.

Outputs of this process are:
- the luma motion vectors in 1/16 fractional-sample accuracy mvA and mvB,
- the reference indices refIdxA and refIdxB,
- the prediction list flags predListFlagA and predListFlagB.

FIG. 3A

The motion vectors mvA and mvB, the reference indices refIdxA and refIdxB and the prediction list flags predListFlagA and predListFlagB are derived by the following ordered steps:

1. The derivation process for luma motion vectors for merge mode as specified in clause 8.5.2.2 is invoked with the luma location ( xCb, yCb ), the variables cbWidth and cbHeight as inputs, and the output being the luma motion vectors mvL0[ 0 ][ 0 ], mvL1[ 0 ][ 0 ], the reference indices refIdxL0, refIdxL1, the prediction list utilization flags predFlagL0[ 0 ][ 0 ] and predFlagL1[ 0 ][ 0 ], the bi-prediction weight index bcwIdx and the merging candidate list mergeCandList.

2. The variables m and n, being the merge index for the geometric partition 0 and 1 respectively, are derived using merge_gpm_idx0[ xCb ][ yCb ] and merge_gpm_idx1[ xCb ][ yCb ] as follows:

m = merge_gpm_idx0[ xCb ][ yCb ]

n = merge_gpm_idx1[ xCb ][ yCb ] + ( merge_gpm_idx1[ xCb ][ yCb ] >= m ) ? 1 : 0

3. Let refIdxL0M and refIdxL1M, predFlagL0M and predFlagL1M, and mvL0M and mvL1M be the reference indices, the prediction list utilization flags and the motion vectors of the merging candidate M at position m in the merging candidate list mergeCandList ( M = mergeCandList[ m ] ).

4. The variable X is set equal to ( m & 0x01 ).

5. When predFlagLXM is equal to 0, X is set equal to ( 1 − X ).

6. The following applies:

mvA[ 0 ] = mvLXM[ 0 ] + GeoMmvdOffset[ 0 ][ x0 ][ y0 ][ 0 ]

mvA[ 1 ] = mvLXM[ 1 ] + GeoMmvdOffset[ 1 ][ x0 ][ y0 ][ 0 ]

refIdxA = refIdxLXM predListFlagA = X

7. Let refIdxL0N and refIdxL1N, predFlagL0N and predFlagL1N, and mvL0N and mvL1N be the reference indices, the prediction list utilization flags and the motion vectors of the merging candidate N at position n in the merging candidate list mergeCandList ( N = mergeCandList[ n ] ).

8. The variable X is set equal to ( n & 0x01 ).

9. When predFlagLXN is equal to 0, X is set equal to ( 1 − X ).

10. The following applies:

mvB[ 0 ] = mvLXN[ 0 ]

mvB[ 1 ] = mvLXN[ 1 ]

refIdxB = refIdxLXN predListFlagB = X

FIG. 3B

GEOMETRIC PARTITIONING MERGE MODE WITH MERGE MODE WITH MOTION VECTOR DIFFERENCE

CROSS REFERENCE TO RELATED APPLICATION

This patent application is a U.S. National Stage application of International Patent Application Number PCT/EP2021/057679 filed Mar. 25, 2021, which is hereby incorporated by reference in its entirety, and claims priority to U.S. 63/004,663 filed Apr. 3, 2020, which is hereby incorporated by reference in its entirety.

TECHNOLOGICAL FIELD

An example embodiment relates generally to techniques in video coding, and, more particularly, to techniques for improving prediction accuracy of geometric partitioning merge mode.

BACKGROUND

Hybrid video codecs may encode video information in several phases. During one phase, pixel values in a picture (e.g., a block) are predicted. This prediction may be done by motion compensation means (e.g., finding and indicating an area in a previously coded video frames that corresponds closely to the block being coded) or by spatial means (e.g., using the pixel values around the block to be coded in a specified manner). Prediction using motion compensation means may be referred to as inter prediction, whereas prediction using spatial means may be referred to as intra prediction.

Versatile Video Coding (VVC) is an international video coding standard under development by the Joint Video Experts Team (WET). VVC is anticipated to be the successor to the High Efficiency Video Coding (HEVC) standard. In VVC, numerous new coding tools are available for coding video, including a number of new and refined inter prediction coding tools, such as, but not limited to, Merge Mode with Motion Vector Difference (MMVD).

In VVC, geometric partitioning merge mode (GEO) is an inter coding mode that allows for flexible partitioning of a coding unit. However, under current VVC design, MMVD is not usable for a GEO coding unit. In VVC design, GEO mode is more flexible in terms of partitioning and more restrictive in terms of motion vector (MV) accuracy. Specifically, 64 angles and distances are supported for GEO partitioning, while only 30 combinations of MV selected from 6 merge candidates are supported for GEO MV. The constraint on MV accuracy prevents GEO from achieving a higher coding efficiency.

BRIEF SUMMARY

In an embodiment, an apparatus is provided comprising at least one processor and at least one memory including computer program code, the at least one memory and the computer program code configured to, with the at least one processor, cause the apparatus to access a coding unit partitioned into a first partition and a second partition. The at least one memory and the computer program code are further configured to, with the at least one processor, cause the apparatus to determine whether an enabling value associated with the coding unit is indicative of additional motion vector refinement, and in accordance with a determination that the enabling value associated with the coding unit is indicative of additional motion vector refinement, determine at least one motion vector difference value for at least one partition of the first partition and the second partition. The at least one memory and the computer program code configured to, with the at least one processor, cause the apparatus to apply a prediction of the coding unit in accordance with the at least one motion vector difference value.

In some embodiments of the apparatus, the coding unit is geometrically partitioned in accordance with Geometric Partitioning Merge Mode. In some embodiments of the apparatus, the at least one motion vector difference value is based at least on a distance value and a direction value associated with the respective partition. In some embodiments of the apparatus, applying the prediction of the coding unit in accordance with the at least one motion vector difference value comprises applying a same motion vector difference value to both the first partition and the second partition. In some embodiments of the apparatus, applying the prediction of the coding unit in accordance with the at least one motion vector difference value comprises applying a motion vector difference value only to a larger of the first partition or the second partition. In some embodiments of the apparatus, determining at least one motion vector difference value for at least one partition of the first partition and the second partition is based on a respective enabling value associated with the first partition and the second partition. In some embodiments of the apparatus, the at least one motion vector difference value is not determined for a particular partition in an instance in which the respective enabling value for the particular partition is indicative that motion vector difference is not to be used.

In another embodiment, an apparatus is provided comprising means for accessing a coding unit partitioned into a first partition and a second partition. The apparatus further comprises means for determining whether an enabling value associated with the coding unit is indicative of additional motion vector refinement, and, in accordance with a determination that the enabling value associated with the coding unit is indicative of additional motion vector refinement, means for determining at least one motion vector difference value for at least one partition of the first partition and the second partition. The apparatus further comprises means for applying a prediction of the coding unit in accordance with the at least one motion vector difference value.

In some embodiments of the apparatus, the coding unit is geometrically partitioned in accordance with Geometric Partitioning Merge Mode. In some embodiments of the apparatus, the at least one motion vector difference value is based at least on a distance value and a direction value associated with the respective partition. In some embodiments of the apparatus, the means for applying the prediction of the coding unit in accordance with the at least one motion vector difference value comprises means for applying a same motion vector difference value to both the first partition and the second partition. In some embodiments of the apparatus, the means for applying the prediction of the coding unit in accordance with the at least one motion vector difference value comprises means for applying a motion vector difference value only to a larger of the first partition or the second partition. In some embodiments of the apparatus, determining at least one motion vector difference value for at least one partition of the first partition and the second partition is based on a respective enabling value associated with the first partition and the second partition. In some embodiments of the apparatus, the at least one motion vector difference value is not determined for a particular partition in an instance in which the respective enabling value for the particular partition is indicative that motion vector difference is not to be used.

In another embodiment, a method is provided comprising accessing a coding unit partitioned into a first partition and a second partition. The method further comprises determining whether an enabling value associated with the coding unit is indicative of additional motion vector refinement, and in accordance with a determination that the enabling value associated with the coding unit is indicative of additional motion vector refinement, determining at least one motion vector difference value for at least one partition of the first partition and the second partition. The method further comprises applying a prediction of the coding unit in accordance with the at least one motion vector difference value.

In some embodiments of the method, the coding unit is geometrically partitioned in accordance with Geometric Partitioning Merge Mode. In some embodiments of the method, the at least one motion vector difference value is based at least on a distance value and a direction value associated with the respective partition. In some embodiments of the method, applying the prediction of the coding unit in accordance with the at least one motion vector difference value comprises applying a same motion vector difference value to both the first partition and the second partition. In some embodiments of the method, applying the prediction of the coding unit in accordance with the at least one motion vector difference value comprises applying a motion vector difference value only to a larger of the first partition or the second partition. In some embodiments of the method, determining at least one motion vector difference value for at least one partition of the first partition and the second partition is based on a respective enabling value associated with the first partition and the second partition. In some embodiments of the method, the at least one motion vector difference value is not determined for a particular partition in an instance in which the respective enabling value for the particular partition is indicative that motion vector difference is not to be used.

In another embodiment, a computer program product is provided comprising a non-transitory computer readable storage medium having program code portions stored thereon, the program code portions configured, upon execution, to access a coding unit partitioned into a first partition and a second partition. The program code portions are further configured, upon execution, to determine whether an enabling value associated with the coding unit is indicative of additional motion vector refinement, and in accordance with a determination that the enabling value associated with the coding unit is indicative of additional motion vector refinement, the program code portions are further configured, upon execution, to determine at least one motion vector difference value for at least one partition of the first partition and the second partition. The program code portions are further configured, upon execution, to apply a prediction of the coding unit in accordance with the at least one motion vector difference value.

In some embodiments of the computer program product, the coding unit is geometrically partitioned in accordance with Geometric Partitioning Merge Mode. In some embodiments of the computer program product, the at least one motion vector difference value is based at least on a distance value and a direction value associated with the respective partition. In some embodiments of the computer program product, applying the prediction of the coding unit in accordance with the at least one motion vector difference value comprises applying a same motion vector difference value to both the first partition and the second partition. In some embodiments of the computer program product, applying the prediction of the coding unit in accordance with the at least one motion vector difference value comprises applying a motion vector difference value only to a larger of the first partition or the second partition. In some embodiments of the computer program product, determining at least one motion vector difference value for at least one partition of the first partition and the second partition is based on a respective enabling value associated with the first partition and the second partition. In some embodiments of the computer program product, the at least one motion vector difference value is not determined for a particular partition in an instance in which the respective enabling value for the particular partition is indicative that motion vector difference is not to be used.

BRIEF DESCRIPTION OF THE DRAWINGS

Figure 1:
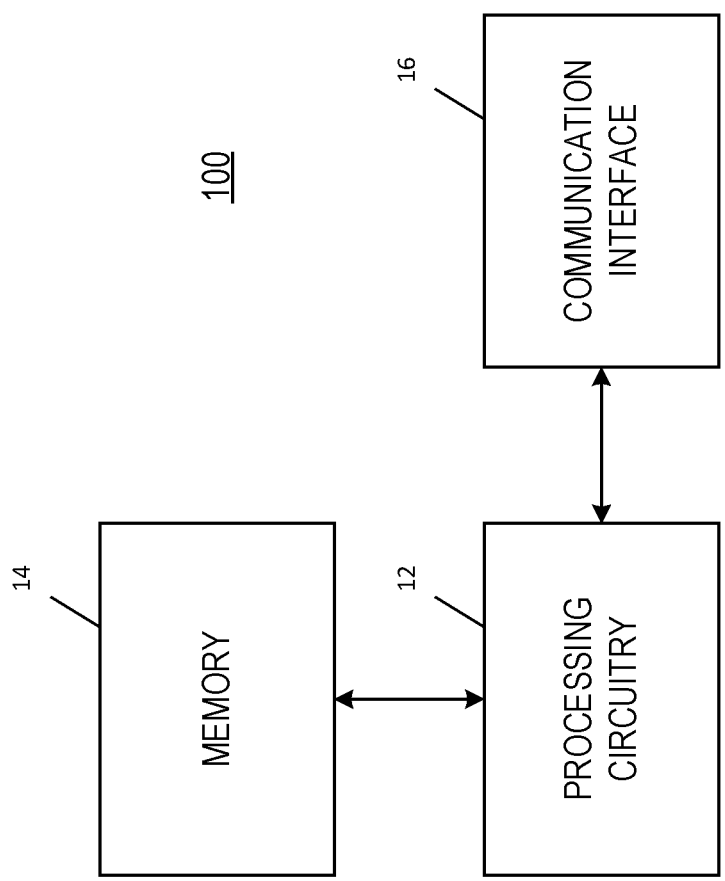
Figure 2:
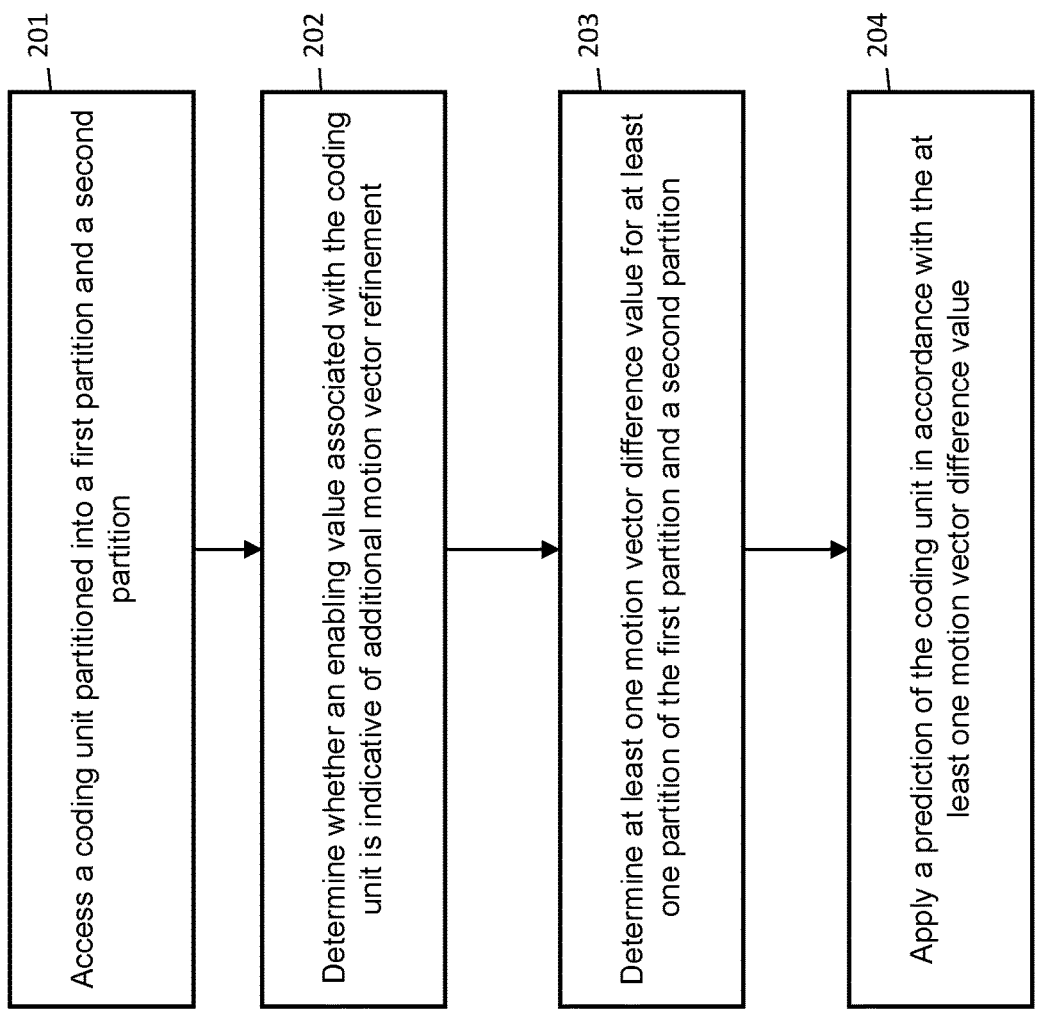

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present disclosure;

FIG. 2 is a flow diagram illustrating operations performed in accordance with an example embodiment;

FIG. 3A is a representation of particular semantics changes for the VVC Specification in accordance with an example embodiment; and FIG. 3B is a representation of particular semantics changes for the VVC Specification in accordance with an example embodiment.

DETAILED DESCRIPTION

Some embodiments of the present disclosure will now be described more fully hereinafter with reference to the accompanying drawings, in which some, but not all, embodiments of the disclosure are shown. Indeed, some embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

As described above, hybrid video codecs, for example ITU-T H.263, H.264/Advanced Video Coding (AVC) and High Efficiency Video Coding (HEVC), may encode video information in phases. During a first phase, pixel values in a block are predicted, for example, by motion compensation means or by spatial means. In the first phase, predictive coding may be applied, for example, as sample, or syntax, prediction. In sample prediction, pixel or sample values in a block are predicted. These pixel or sample values can be predicted, for example, using one or more of motion compensation or intra prediction mechanisms.

Motion compensation mechanisms (also referred to as inter prediction, temporal prediction, motion-compensated temporal prediction or motion-compensated prediction (MCP)) involve locating and indicating an area in a previously encoded video frame that corresponds closely to the block being coded. In this regard, inter prediction may reduce temporal redundancy.

Intra prediction, in which pixel or sample values can be predicted by spatial mechanisms, involve finding and indicating a spatial region relationship. Intra prediction utilizes the fact that adjacent pixels within the same picture are likely to be correlated. Intra prediction can be performed in the spatial or transform domain (e.g., either sample values or transform coefficients can be predicted). Intra prediction is typically exploited in intra coding, where no inter prediction is applied.

In syntax prediction, which may also be referred to as parameter prediction, syntax elements and/or syntax element values and/or variables derived from syntax elements are predicted from syntax elements (de)coded earlier and/or variables derived earlier.

For example, in motion vector prediction, motion vectors (e.g., for inter and/or inter-view prediction) may be coded differentially with respect to a block-specific predicted motion vector. In many video codecs, the predicted motion vectors are created in a predefined way, for example, by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signal the chosen candidate as the motion vector predictor. In addition to predicting the motion vector values, the reference index of a previously coded/decoded picture can be predicted. The reference index may be predicted from adjacent blocks and/or co-located blocks in temporal reference picture. Differential coding of motion vectors is commonly disabled across slice boundaries. The block partitioning may be predicted, for example, from the coding tree unit to coding units and prediction units (PU).

In filter parameter prediction, the filtering parameters, e.g., for sample adaptive offset may be predicted. As described above, prediction approaches using image information from a previously coded image are also referred to as inter prediction, temporal prediction, and/or motion compensation. Prediction approaches using image information within the same image is also referred to as intra prediction.

In the second phase, the prediction error (e.g., the difference between the predicted block of pixels and the original block of pixels) is coded. This may be done by transforming the difference in pixel values using a specified transform (e.g., a Discrete Cosine Transform (DCT) or a variant of DCT), quantizing the coefficients, and entropy coding the quantized coefficients. By varying the fidelity of the quantization process, an encoder can control the balance between the accuracy of the pixel representation (e.g., picture quality) and size of the resulting coded video representation (e.g., file size of transmission bitrate).

In video codecs including H.264/AVC and HEVC, motion information is indicated by motion vectors associated with each motion compensated image block. Each of these motion vectors represents the displacement of the image block in the picture to be coded (at the encoder) or decoded (at the decoder) and the prediction source block in one of the previously coded or decoded images (or pictures). In H.264/AVC and HEVC, and many other video compression standards, a picture is divided into a mesh of rectangles, for each of which a similar block in one of the reference pictures is indicated for inter prediction. The location of the prediction block is coded as a motion vector that indicates the position of the prediction block relative to the block being coded.

Versatile Video Coding (VVC) presents numerous new coding tools. For example, VVC includes new coding tools for intra prediction including, but not limited to, 67 intra mode with wide angle mode extension, block size and mode dependent 4 tap interpolation filter, position-dependent intra prediction combination (PDPC), cross-component linear model intra prediction, multi-reference line intra prediction, intra sub-partitions, and weighted intra prediction with matrix multiplication. Additionally, VVC includes new coding tools for inter-picture prediction, such as block motion copy with spatial, temporal, history-based, and pairwise average merging candidates, affine motion inter prediction, sub-block based temporal MV prediction, adaptive MV resolution, 8×8 block-based motion compression for temporal motion prediction, high precision motion vector storage and motion compensation with 8-tap interpolation filter for luma components and 4-tap interpolation filter for chroma components, triangular partitions, combined intra and inter prediction (CIIP), merge with motion vector difference (MMVD), symmetrical MVD coding, bi-directional optical flow, decoder-side motion vector refinement, bi-prediction with CU-level weight, and the like.

VVC also includes new coding tools for transform, quantization, and coefficients coding, such as multiple primary transform selection with DCT2, DST7, and DCT8, secondary transform for low frequency zone, sub-block transform for inter predicted residual, dependent quantization with max QP increased from 51 to 63, transform coefficient coding with sign data hiding, transform skip residual coding, and the like. Additionally, VVC includes new coding tools for entropy coding, such as arithmetic coding engine with adaptive double windows probability update, in-loop filter coding tools such as in-loop reshaping, deblocking filter with strong longer filter, sample adaptive offset, and adaptive loop filter. Also included are screen content coding tools such as current picture referencing with reference region restriction, 360-degree video coding tools such as horizontal wrap-around motion compensation, and high-level syntax and parallel processing tools such as reference picture management with direct reference picture list signaling, and tile groups with rectangular shape tile groups.

In VVC partitioning, each picture is divided into coding tree units (CTUs) similar to HEVC. A picture may also be divided into slices, tiles, bricks and/or sub-pictures. A CTU may be split into smaller CUs using multi-type partitioning (e.g., quad tree (QT), binary tree (BT), ternary tree (TT), and/or the like). Additionally, there are specific rules to infer partitioning in in-picture boundaries, and redundant split patterns are not allowed in nested multi-type partitioning.

For inter prediction in VVC, a merge list may include candidates such as spatial motion vector prediction (MVP) from spatial neighboring CUs, temporal MVP from collocated CUs, history-based MVP from a first-in-first-out (FIFO) table, pairwise average MVP (e.g., using candidates already in the merge list), or zero (0) motion vectors.

Merged mode with motion vector difference (MMVD) signals MVDs and a resolution index after signaling a merge candidate. In symmetric MVD, motion information of list-1 are derived from motion information of list-0 in a case of bi-prediction. In affine prediction, several motion vectors are indicated or signaled for different corners of a block, which are used to derive the motion vectors of a sub-block. In affine merge, affine motion information of a block is generated based on the normal or affine motion information of the neighboring blocks. In sub-block-based temporal motion vector prediction, motion vectors of sub-blocks of the current block are predicted from appropriate subblocks in the reference frame which are indicated by the motion vector of a spatial neighboring block, if one is available. In adaptive motion vector resolution (AMVR), the precision of MVD is signaled for each CU. In bi-prediction with CU-level weight, an index indicates the weight values for a weighted average of two prediction blocks. Bi-directional optical flow (BDOF) refines the motion vectors in a bi-prediction case. BDOF generates two prediction blocks using the signaled motion vectors. A motion refinement is then calculated to minimize the error between two prediction blocks using their gradient values, and the final prediction blocks are refined using the motion refinement and gradient values.

VVC comprises three in-loop filters including a deblocking filter and SAO (both in HEVC), as well as an adaptive loop filter (ALF). The order of the filtering process in VVC begins with the deblocking filter, followed by SAO and then ALF. The SAO in VVC is the same as the SAO in HEVC.

For the luma component, ALF selects one of 25 filters for each 4×4 block based on a classification from the direction and activity of local gradients. Additionally, two diamond filter shapes are used.

ALF filter parameters are signalled in Adaptation Parameter Set (APS). In one APS, up to 25 sets of luma filter coefficients and clipping value indexes, as well as up to eight sets of chroma filter coefficients and clipping value indexes may be signalled. To reduce bits overhead, filter coefficients of different classifications for luma components can be merged. In slice header, the indices of up to seven (7) adaptation parameter sets used for the current slice are signaled.

For chroma components, an APS index is signaled in the slice header to indicate the chroma filter sets being used for the current slice. At CTB level, a filter index is signaled for each chroma CTB if there is more than one chroma filter set in the APS. The filter coefficients are quantized, with norm equal to 128. In order to restrict the multiplication complexity, a bitstream conformance is applied so that the coefficient value of the non-central position is in the range of −27 to 27−1, inclusive. The central position coefficient is not signalled in the bitstream and is considered equal to 128.

At decoder side, when ALF is enabled for a CTB, each sample R(i,j) within the CU is filtered, resulting in sample value R'(i,j) as shown:

$$R'(i, j) = R(i, j) + \left(\left(\sum_{k \neq 0}\sum_{l \neq 0} f(k, l) \times K(R(i+k, j+l) - R(i, j), c(k, l)) + 64\right) >> 7\right)$$

wherein f(k,l) denotes the decoded filter coefficients, K(x,y) is the clipping function and c(k,l) denotes the decoded clipping parameters. The variable k and l varies between −L/2 and L/2 where L denotes the filter length. The clipping function K(x,y)=min (y,max (−y,x)) corresponds to the function Clip3 (−y,y,x).

Cross Component Adaptive Loop Filter (CCALF) uses a linear filter to filter luma sample values and generate a residual correction for the chroma channels from the co-located filtered output. The filter is designed to operate in parallel with the existing luma ALF. CCALF design uses a 3×4 diamond shape with eight (8) unique coefficients. When a restriction is placed that enables either chroma ALF or CCALF for chroma components of a CTU, the per-pixel multiplier count is limited to 16 (the current ALF is 15). The filter coefficient dynamic range is limited to 6-bit signed.

To align with the existing ALF design, the filter coefficients are signaled in the APS. Up to four (4) filters are supported, and filter selection is indicated at the CTU level. Symmetric line selection is used at the virtual boundary to further harmonize with ALF. Additionally, to limit the amount of storage needed by the correction output, the CCALF residual output is clipped to $-2^{BitDepthC-1}$ to $2^{BitDepthC-1}$, inclusive.

In the VVC specification, geometric partitioning merge mode (GEO) is an inter coding mode that allows flexible partitioning of a CU into two (2) unequal size rectangular or two (2) non-rectangular partitions. The two partitions in a GEO CU each have their own respective uni-direction MV. These MVs are derived from the merge candidate index signalled in the bitstream. VVC also supports merge mode with MV difference (MMVD) as described above. A CU using MMVD derives its MV from a base MV and an MVD. The base MV is determined based on one of the first two candidates in the merge list. The MVD is an offset which is selectable from a set of 32 predetermined choices. However, MMVD is not allowed for a GEO CU.

In VVC, GEO provides added flexibility in terms of partitioning however is more restrictive in terms of MV accuracy. In particular, 64 angles and distances are supported for GEO partitioning, while only 30 combinations of MV selected from six (6) merge candidates are supported for GEO MV. This constraint on MV accuracy prevents GEO from achieving higher coding efficiency.

One example of an apparatus 100 that may be configured to carry out operations in accordance with an embodiment described herein is depicted in FIG. 1. As shown in FIG. 1, the apparatus includes, is associated with or is in communication with processing circuitry 12, a memory 14 and a communication interface 16. The processing circuitry 12 may be in communication with the memory via a bus for passing information among components of the apparatus. The memory may be non-transitory and may include, for example, one or more volatile and/or non-volatile memories. In other words, for example, the memory may be an electronic storage device (e.g., a computer readable storage medium) comprising gates configured to store data (e.g., bits) that may be retrievable by a machine (e.g., a computing device like the processing circuitry). The memory may be configured to store information, data, content, applications, instructions, or the like for enabling the apparatus to carry out various functions in accordance with an example embodiment of the present disclosure. For example, the memory could be configured to buffer input data for processing by the processing circuitry. Additionally, or alternatively, the memory could be configured to store instructions for execution by the processing circuitry.

The apparatus 100 may, in some embodiments, be embodied in various computing devices. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally, or alternatively, the processing circuitry may include one or more processors configured in tandem via the bus to enable independent execution of instructions, pipelining and/or multithreading.

In an example embodiment, the processing circuitry 12 may be configured to execute instructions stored in the memory 14 or otherwise accessible to the processing circuitry. Alternatively, or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ one embodiment by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 16 may be any means such as a device or circuitry embodied in either hardware or a combination of hardware and software that is configured to receive and/or transmit data, including media content in the form of video or image files, one or more audio tracks or the like. In this regard, the communication interface may include, for example, an antenna (or multiple antennas) and supporting hardware and/or software for enabling communications with a wireless communication network. Additionally, or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

According to some embodiments, the apparatus 100 may be configured in accordance with an architecture for providing for video encoding, decoding, and/or compression. In this regard, the apparatus 100 may be configured as a video coding device. For example, the apparatus 300 may be configured to code video in accordance with one or more video compression standards, such as, for example, the VVC Specification (e.g., B. Bross, J. Chen, S. Lin, and Y-K. Wang, "Versatile Video Coding", JVET-Q2001-v13, January 2020, incorporated by reference herein). While certain embodiments herein refer to operations associated with the VVC standard, it is to be appreciated that the processes discussed herein may be utilized for any video coding standard.

A JVET contribution, JVET-Q0315, describes triangular prediction mode with MVD. In particular, JVET-Q0315 proposes allowing MVD with triangular prediction mode, a subset and precursor of GEO. The associated proposed merge data syntax of JVET-Q0315 is shown below in Table A, wherein an enabling flag, tmvd_part_flag, is used to signal usage of the proposed mode and is always coded for partition index 0. Only when the enabling flag for partition index 0 is true, a second flag, an enabling flag for partition index 1, is sent. MVD distance and direction are signalled for a GEO partition when its enabling flag is true.

TABLE A

| | |
|---|---|
| if( !ciip_flag[ x0 ][ y0 ] && MaxNumTriangleMergeCand > 1 ) { | |
|   merge_triangle_split_dir[ x0 ][ y0 ] | ae(v) |
|   merge_triangle_idx0[ x0 ][ y0 ] | ae(v) |
|   if( MaxNumTriangleMergeCand > 2 ) | |
|     merge_triangle_idx1[ x0 ][ y0 ] | ae(v) |
|   tmvd_flag[ x0 ][ y0 ] | ae(v) |
|   if(tmvd_flag[ x0 ][ y0 ]){ | |
|     for( partIdx = 0; partIdx < 2; partIdx++ ) { | |
|       if(partIdx == 0 \|\| tmvd_part_flag[ x0 ][ y0 ][ 0 ]) | |
|         tmvd_part_flag[ x0 ][ y0 ][ partIdx ] | |
|       if(tmvd_part_flag[ x0 ][ y0 ][ partIdx]){ | |
|         tmvd_distance_idx[ x0 ][ y0 ][ partIdx] | ae(v) |
|         tmvd_direction_idx[ x0 ][ y0 ][ partIdx] | ae(v) |
|       } | |
|     } | |
|   } | |
| } | |

Certain embodiments described herein provide for an extension of GEO to allow MMVD-style MV refinement.

This extension improves prediction accuracy of GEO mode by allowing more flexible motion vectors for GEO partitioning. However, while flexibility in MV refinement may come with a cost in terms of overhead bits and implementation complexity, some embodiments described herein utilize an approach that minimizes these costs while maximizing coding efficiency, as MMVD in VVC has proven to be an efficient tool with low complexity.

In other words, certain embodiments herein utilize VVC GEO usage syntax in combination with new syntax elements for enabling conditions. In particular, VVC GEO without refinement is used when VVC GEO usage syntax is indicated as true and a new syntax element is indicated as false and GEO with MMVD is used when both VVC GEO usage and the new syntax element are indicated to be true. VVC GEO syntax mechanisms to indicate MV of the two GEO For example, in an embodiment, an enabling value, such as an additional control flag, may be used to indicate usage of additional motion vector refinement. As one example, MV refinement with two different offsets may be used (e.g., with one offset for each GEO partition). In particular, a flag variable, geo_mmvd_flag, may be utilized as a secondary usage flag and used in conjunction with ciip_flag to indicate usage of the proposed GEO with MMVD mode. Additionally, in this embodiment, four syntax elements may be utilized to provide information in order to calculate a motion vector difference value for the GEO with MMVD mode. These four syntax elements are geo_mmvd_distance_idx0, geo_mmvd_direction_idx0, geo_mmvd_distance_idx1, geo_mmvd_direction_idx1. The following Table B table shows these syntax elements.

TABLE B

```
} else {
    if( sps_ciip_enabled_flag && sps_gpm_enabled_flag &&
        slice_type = = B &&
        cu_skip_flag[ x0 ][ y0 ] = = 0 && cbWidth >= 8 && cbHeight >= 8 &&
        cbWidth < ( 8 * cbHeight ) && cbHeight < ( 8 * cbWidth ) &&
        cbWidth < 128 && cbHeight < 128 )
        ciip_flag[ x0 ][ y0 ]                                              ae(v)
    if( ciip_flag[ x0 ][ y0 ] && MaxNumMergeCand > 1 )
        merge_idx[ x0 ][ y0 ]                                              ae(v)
    if( !ciip_flag[ x0 ][ y0 ] ) {
        merge_gpm_—partition_idx[ x0 ][ y0 ]                               ae(v)
        merge_gpm_idx0[ x0 ][ y0 ]                                         ae(v)
        if( MaxNumGpmMergeCand > 2 )
            merge_gpm_idx1[ x0 ][ y0 ]                                     ae(v)
        geo_mmvd_flag[ x0 ][ y0 ]                                          ae(v)
        if ( geo_mmvd_flag[ x0 ][ y0 ] ) {
            geo_mmvd_distance_idx0[ x0 ][ y0 ]                             ae(v)
            geo_mmvd_direction_idx0[ x0 ][ y0 ]                            ae(v)
            geo_mmvd_distance_idx1[ x0 ][ y0 ]                             ae(v)
            geo_mmvd_direction_idx1[ x0 ][ y0 ]                            ae(v)
        }
    }
}
``` partitions are reused to determine base MVs. MVD may be calculated using mechanisms similar to that of MMVD syntax, e.g., by using syntax for distance and syntax for direction to find MVD from a predetermined lookup table.

FIG. 2 shows example operations that may be performed by apparatus 100 for extending GEO to allow for additional motion vector refinement. At operation 201, the apparatus 100 includes means, such as processor 12, memory 14, and/or the like, configured to access a coding unit partitioned into a first partition and a second partition. For example, the coding unit may be accessed as part of a coding process, such as an encoding process or a decoding process. In some embodiments, the coding unit is geometrically partitioned in accordance with GEO.

At operation 202, the apparatus 100 includes means, such as processor 12, memory 14, and/or the like, configured to determine whether an enabling value associated with the coding unit is indicative of additional motion vector refinement.

In this regard, at operation 203, in accordance with a determination that the enabling value associated with the coding unit is indicative of additional motion vector refinement, the apparatus 100 includes means, such as processor 12, memory 14, and/or the like, configured to calculate at least one motion vector difference value for at least one partition of the first partition and a second partition. As described above, the at least one motion vector difference value is based at least on a distance value and a direction value associated with the respective partition.

At operation 204, the apparatus 100 includes means, such as processor 12, memory 14, and/or the like, configured to apply a prediction of the coding unit in accordance with the at least one motion vector difference value.

In another embodiment, two syntax elements to provide information to calculate the MVD value for the GEO with MMVD mode. These two syntax elements are geo_mmvd_distance_idx and geo_mmvd_direction_idx. For example, Table C below shows these syntax value.

TABLE C

```
} else {
    if( sps_ciip_enabled_flag && sps_gpm_enabled_flag &&
        slice_type = = B &&
        cu_skip_flag[ x0 ][ y0 ] = = 0 && cbWidth >= 8 && cbHeight >= 8 &&
        cbWidth < ( 8 * cbHeight ) && cbHeight < ( 8 * cb Width ) &&
        cbWidth < 128 && cbHeight < 128 )
        ciip_flag[ x0 ][ y0 ]                                              ae(v)
```

TABLE C-continued

```
if( ciip_flag[ x0 ][ y0 ] && MaxNumMergeCand > 1 )
   merge_idx[ x0 ][ y0 ]                                          ae(v)
if( !ciip_flag[ x0 ][ y0 ] ) {
   merge_gpm_partition_idx1[ x0 ][ y0 ]                           ae(v)
   merge_gpm_idx0[ x0 ][ y0 ]                                     ae(v)
   if( MaxNumGptnMergeCand > 2 )
      merge_gpm_idx1[ x0 ][ y0 ]                                  ae(v)
   geo_mmvd_flag[ x0 ][ y0 ]                                      ae(v)
   if ( geo_mmvd_flag[ x0 ][ y0 ] ) {
      geo_mmvd_distance_idx[ x0 ][ y0 ]                           ae(v)
      geo_mmvd_direction_idx[ x0 ][ y0 ]                          ae(v)
   }
 }
}
```

For example, in some embodiments, the apparatus 300 may always apply the MVD value to a particular partition (e.g., GEO partition index 0). Similarly, in some embodiments, the apparatus 300 may always apply the MVD value to GEO partition index 1. In another embodiment, the apparatus 300 may apply the MVD value to a GEO partition index based on the GEO partition mode in a predetermined manner, such as, for example, applying a MVD value to a larger partition in the particular CU. In some embodiments, applying the partitioning of the picture in accordance with the at least one motion vector difference value comprises applying a same motion vector difference value to both the first partition and the second partition.

For example, in this embodiment, the flag variable, geo_mmvd_flag[x0][y0], when equal to 1, specifies that geometric partitioning merge mode with motion vector difference is used to generate the inter prediction parameters of the current coding unit. Likewise, geo_mmvd_flag[x0][y0], when equal to 0, specifies that geometric partitioning mode with motion vector difference is not used to generate the inter prediction parameters. The array indices x0, y0 specify the location (x0, y0) of the top-left luma sample of the considered coding block relative to the top-left luma sample of the picture. In an instance in which geo_mmvd_flag[x0][y0] is not present, it is inferred to be equal to 0.

The variable geo_mmvd_distance_idx[x0][y0] specifies the index used to derive GeoMmvdDistance[0][x0][y0] as specified in Table D below. The array indices x0, y0 specify the location (x0, y0) of the top-left luma sample of the considered coding block relative to the top-left luma sample of the picture.

TABLE E

| geo_mmvd_direction_idx [ x0 ][ y0 ] | GeoMmvdSign [ x0 ][ y0 ][ 0 ] | GeoMmvdSign [ x0 ][ y0 ][ 1 ] |
|---|---|---|
| 0 | +1 | 0 |
| 1 | −1 | 0 |
| 2 | 0 | +1 |
| 3 | 0 | −1 |

Both components of the geometric partitioning merge plus MVD offset GeoMmvdOffset[x0][y0] are derived as follows:

$$GeoMmvdOffset[x0][y0][0]=(GeoMmvdDistance[x0][y0]<<2)*GeoMmvdSign[x0][y0][0]$$

$$GeoMmvdOffset[x0][y0][1]=(GeoMmvdDistance[x0][y0]<<2)*GeoMmvdSign[x0][y0][1]$$

In another embodiment, two additional control flag variables may be utilized to indicate usage of the method. In this regard, in an instance in which the method is enabled, MV refinement with two different offsets may be used (e.g., with one offset for each GEO partition). In particular, two flag variables, geo_mmvd_idx0_flag and geo_mmvd_idx1_flag, are utilized as two secondary usage flags in conjunction with ciip_flag to indicate usage of the GEO with MMVD mode for each GEO partition. Additionally, in this embodiment, four syntax elements are used to provide information to

TABLE D

| geo_mmvd_distance_idx | GeoMmvdDistance[ x0 ][ y0 ] | |
|---|---|---|
| [ x0 ][ y0 ] | ph_fpel_mmvd_enabled_flag == 0 | ph_fpel_mmvd_enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

The variable geo_mmvd_direction_idx[x0][y0] specifies the index used to derive GeoMmvdSign[x0][y0] as specified below in Table E. The array indices x0, y0 specify the location (x0, y0) of the top-left luma sample of the considered coding block relative to the top-left luma sample of the picture.

calculate the MVD for the GEO with MMVD mode. The four syntax elements are geo_mmvd_distance[0], geo_mmvd_direction[0], geo_mmvd_distance[1], geo_mmvd_direction[1]. In this regard, Tables F and G below show two examples of the syntax elements and their semantic description.

TABLE F

```
} else {
  if( sps_ciip_enabled_flag && sps_gpm_enabled_flag &&
    slice_type = = B &&
    cu_skip_flag[ x0 ][ y0 ] = = 0 && cbWidth >= 8 && cbHeight >= 8 &&
    cbWidth < ( 8 * cbHeight ) && cbHeight < ( 8 * cbWidth ) &&
    cbWidth < 128 && cbHeight < 128 )
    ciip_flag[ x0 ][ y0 ]                                              ae(v)
  if( ciip_flag[ x0 ][ y0 ] && MaxNumMergeCand > 1 )
    merge_idx[ x0 ][ y0 ]                                              ae(v)
  if( !ciip_flag[ x0 ][ y0 ] ) {
    merge_gpm_partition_idx[ x0 ][ y0 ]                                ae(v)
    merge_gpm_idx0[ x0 ][ y0 ]                                         ae(v)
    if( MaxNumGpmMergeCand > 2 )
      merge_gpm_idx1[ x0 ][ y0 ]                                       ae(v)
    geo_inmvd_idx0_flag[ x0 ][ y0 ]                                    ae(v)
    geo_mmvd_idx1_flag[ x0 ][ y0 ]                                     ae(v)
    if( geo_mmvd_idx0_flag[ x0 ][ y0 ] ) {
      geo_mmvd_ distance_idx[ 0 ][ x0 ][ y0 ]                          ae(v)
      geo_mmvd_ direction_idx[ 0 ][ x0 ][ y0 ]                         ae(v)
    }
    if ( geo_mmvd_ idx1_flag[ x0 ][ y0 ] ) {
      geo_mmvd_ distance_idx[ 1 ][ x0 ][ y0 ]                          ae(v)
      geo_mmvd_direction_idx[ 1 ][ x0 ][ y0 ]                          ae(v)
    }
  }
}
```

TABLE G

```
} else {
  if( sps_ciip_enabled_flag && sps_gpm_enabled_flag &&
    slice_type = = B &&
    cu_skip_flag[ x0 ][ y0 ] = = 0 && cbWidth >= 8 && cbHeight >= 8 &&
    cbWidth < ( 8 * cbHeight ) && cbHeight < ( 8 * cbWidth ) &&
    cbWidth < 128 && cbHeight < 128 )
    ciip_flag[ x0 ][ y0 ]                                              ae(v)
  if( ciip_flag[ x0 ][ y0 ] && MaxNumMergeCand > 1 )
    merge_idx[ x0 ][ y0 ]                                              ae(v)
  if( !ciip_flag[ x0 ][ y0 ] ) {
    merge_gpm_partition_idx[ x0 ][ y0 ]                                ae(v)
    merge_gpm_idx0[ x0 ][ y0 ]                                         ae(v)
    if( MaxNumGpmMergeCand > 2 )
      merge_gpm_idx1[ x0 ][ y0 ]                                       ae(v)
    geo_mmvd_idx0_flag[ x0 ][ y0 ]                                     ae(v)
    if( geo_mmvd_ idx0_flag[ x0 ][ y0 ] ) {
      geo_mmvd_distance_idx[ 0 ][ x0 ][ y0 ]                           ae(v)
      geo_mmvd_direction_idx[ 0 ][ x0 ][ y0 ]                          ae(v)
    }
    geo_mmvd_idx1_flag[ x0 ][ y0 ]                                     ae(v)
    if ( geo_mmvd_idx1_flag[ x0 ][ y0 ] ) {
      geo_mmvd_distance_idx[ 1 ][ x0 ][y0 ]                            ae(v)
      geo_mmvd_direction_idx[ 1 ][ x0 ][ y0 ]                          ae(v)
    }
  }
}
```

The variable geo_mmvd_idx0_flag[x0][y0], when equal to 1, indicates that geometric partitioning merge mode with motion vector difference is used to generate the inter prediction parameters associated with the first merging candidate index of the geometric partitioning based motion compensation candidate list. The variable geo_mmvd_idx0_flag [x0][y0], when equal to 0, indicates that geometric partitioning mode with motion vector difference is not used to generate the inter prediction parameters associated with the first merging candidate index of the geometric partitioning based motion compensation candidate list. The array indices x0, y0 specify the location (x0, y0) of the top-left luma sample of the considered coding block relative to the top-left luma sample of the picture. When geo_mmvd_idx0_flag[x0][y0] is not present, it is inferred to be equal to 0.

The variable, geo_mmvd_idx1_flag[x0][y0], when equal to 1, specifies that geometric partitioning merge mode with motion vector difference is used to generate the inter prediction parameters associated with the second merging candidate index of the geometric partitioning based motion compensation candidate list. The variable geo_mmvd_idx1_flag[x0][y0], when equal to 0, specifies that geometric partitioning mode with motion vector difference is not used to generate the inter prediction parameters associated with the second merging candidate index of the geometric partitioning based motion compensation candidate list. The array indices x0, y0 specify the location (x0, y0) of the top-left luma sample of the considered coding block relative to the top-left luma sample of the picture. When geo_mmvd_idx1_flag[x0][y0] is not present, it is inferred to be equal to 0.

The variable, geo_mmvd_distance_idx[PartIdx][x0][y0] specifies the index used to derive GeoMmvdDistance[PartIdx][x0][y0] as specified in Table H. The array indices x0, y0 specify the location (x0, y0) of the top-left luma sample of the considered coding block relative to the top-left luma sample of the picture.

TABLE H

| geo_mmvd_distance_idx [ PartIdx ][ x0 ][ y0 ] | GeoMmvdDistance[ PartIdx ][ x0 ][ y0 ] | |
|---|---|---|
| | ph_fpel_mmvd_enabled_flag == 0 | ph_fpel_mmvd_enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

The variable geo_mmvd_direction_idx[PartIdx][x0][y0] specifies index used to derive GeoMmvdSign[PartIdx][x0][y0] as specified in Table I. The array indices x0, y0 specify the location (x0, y0) of the top-left luma sample of the considered coding block relative to the top-left luma sample of the picture.

TABLE I

| geo_mmvd_direction_idx [ PartIdx ][ x0 ][ y0 ] | GeoMmvdSign[ PartIdx ][ x0 ][ y0 ][ 0 ] | GeoMmvdSign[ PartIdx ][ x0 ][ y0 ][ 1 ] |
|---|---|---|
| 0 | +1 | 0 |
| 1 | −1 | 0 |
| 2 | 0 | +1 |
| 3 | 0 | −1 |

When geo_mmvd_idx0_flag is equal to 1, both components of the geometric partitioning merge plus MVD offset GeoMmvdOffset[0][x0][y0] are derived as follows:

GeoMmvdOffset[0][x0][y0][0]=(GeoMmvdDistance[0][x0][y0]<<2)*GeoMmv dSign[0][x0][y0][0]

GeoMmvdOffset[0][x0][y0][1]=(GeoMmvdDistance[0][x0][y0]<<2)*GeoMmv dSign[0][x0][y0][1]

When geo_mmvd_idx0_flag is equal to 0, both components of the geometric partitioning merge plus MVD offset GeoMmvdOffset[0][x0][y0] are set to zero.

When geo_mmvd_idx1_flag is equal to 1, both components of the geometric partitioning merge plus MVD offset GeoMmvdOffset[1][x0][y0] are derived as follows:

GeoMmvdOffset[1][x0][y0][0]=(GeoMmvdDistance[1][x0][y0]<<2)*GeoMmv dSign[1][x0][y0][0]

GeoMmvdOffset[1][x0][y0][1]=(GeoMmvdDistance[1][x0][y0]<<2)*GeoMmv dSign[1][x0][y0][1]

When geo_mmvd_idx1_flag is 0, both components of the geometric partitioning merge plus MVD offset GeoMmvdOffset[1][x0][y0] are set to zero.

FIGS. 3A-3B show semantics changes to the VVC specification in accordance with operations described herein.

In another embodiment, two additional control flags to indicate usage of the proposed method. When the proposed method is enabled, MV refinement with up to two different offsets is used (e.g., one offset for each GEO partition).

Similar to the embodiment described above, two flag variables, geo_mmvd_idx0_flag and geo_mmvd_idx1_flag, are utilized as two secondary usage flags in conjunction with ciip_flag to indicate usage of the GEO with MMVD mode for each GEO partition. Unlike the above embodiment wherein geo_mmvd_idx0_flag and geo_mmvd_idx1_flag are independent of each other, a dependency between the two flags variables is utilized. For example, geo_mmvd_idx1_flag is signalled only when geo_mmvd_idx1_flag is indicated to be true. Additionally, four syntax elements provide information to calculate the MVD value for the GEO with MMVD mode. The four new syntax elements are geo_mmvd_distance_idx0, geo_mmvd_direction_idx0, geo_mmvd_distance_idx1, geo_mmvd_direction_idx1. In this regard, Tables J and K below show two examples of the syntax elements.

TABLE J

```
} else {
  if( sps_ciip_enabled_flag && sps_gpm_enabled_flag &&
    slice_type == B &&
    cu_skip_flag[ x0 ][ y0 ] == 0 && cbWidth >= 8 && cbHeight >= 8 &&
    cbWidth < ( 8 * cbHeight ) && cbHeight < ( 8 * cbWidth ) &&
    cbWidth < 128 && cbHeight < 128 )
    ciip_flag[ x0 ][ y0 ]                                              ae(v)
  if( ciip_flag[ x0 ][y0 ] && MaxNumMergeCand > 1 )
    merge_idx[ x0 ][ y0 ]                                              ae(v)
  if( !ciip_flag[ x0 ][y0 ] ) {
    merge_gpm_partition_idx[ x0 ][ y0 ]                                ae(v)
    merge_gpm_idx0[ x0 ][ y0 ]                                         ae(v)
```

TABLE J-continued

```
    if( MaxNumGpmMergeCand > 2 )
        merge_gpm_idx1[ x0 ][ y0 ]                              ae(v)
    geo_mmvd_idx0_flag[ x0 ][ y0 ]                              ae(v)
    if ( geo_mmvd_ idx0_flag[ x0 ][ y0 ] )
        geo_mmvd_idx1_flag[ x0 ][ y0 ]                          ae(v)
    if ( geo_mmvd_idx0_flag[ x0 ][ y0 ] ) {
        geo_mmvd_distance_idx0[ x0 ][ y0 ]                      ae(v)
        geo_mmvd_direction_idx0[ x0 ][ y0 ]                     ae(v)
    }
    if ( geo_mmvd_idx1_flag[ x0 ][ y0 ] ) {
        geo_mmvd_distance_idx1[ x0 ][ y0 ]                      ae(v)
        geo_mmvd_direction_idx1[ x0 ][ y0 ]                     ae(v)
        }
    }
}
```

TABLE K

```
} else {
    if( sps_ciip_enabled_flag && sps_gpm_enabled_flag &&
        slice_type = = B &&
        cu_skip_flag[ x0 ][ y0 ] = = 0 && cbWidth >= 8 && cbHeight >= 8 &&
        cbWidth < ( 8 * cbHeight ) && cbHeight < ( 8 * cbWidth ) &&
        cbWidth < 128 && cbHeight < 128 )
        ciip_flag[ x0 ][ y0 ]                                   ae(v)
    if( ciip_flag[ x0 ][ y0 ] && MaxNumMergeCand > 1 )
        merge_idx[ x0 ][ y0 ]                                   ae(v)
    if( !ciip_flag[ x0 ][ y0 ] ) {
        merge_gpm_partition_idx[ x0 ][ y0 ]                     ae(v)
        merge_gpm_idx0[ x0 ][ y0 ]                              ae(v)
        if( MaxNumGpmMergeCand > 2 )
            merge_gpm_idx1[ x0 ][ y0 ]                          ae(v)
        geo_mmvd_idx0_flag[ x0 ][ y0 ]                          ae(v)
        if ( geo_mmvd_idx0_flag[ x0 ][ y0 ] ) {
            geo_mmvd_distance_idx0[ x0 ][ y0 ]                  ae(v)
            geo_mmvd_direction_idx0[ x0 ][ y0 ]                 ae(v)
            geo_mmvd_idx1_flag[ x0 ][ y0 ]                      ae(v)
            if ( geo_mmvd_ idx1_flag[ x0 ][ y0 ] ) {
                geo_mmvd_distance_idx1[ x0 ][ y0 ]              ae(v)
                geo_mmvd_direction_idx1[ x0 ][ y0 ]             ae(v)
            }
          }
      }
}
```

FIG. 2 illustrates a flowchart depicting methods according to certain example embodiments. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 34 of an apparatus employing an embodiment of the present disclosure and executed by a processor 32. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising:
   at least one processor; and
   at least one memory storing instructions that, when executed by the at least one processor, cause the apparatus to perform at least the following:
   performing a coding process for video, wherein the coding process is one of encoding video into encoded video for placement into a bitstream or decoding video using the bitstream to form decoded video, the coding process comprising:
   accessing a coding unit corresponding to the video partitioned into a first partition and a second partition, wherein the coding unit is geometrically partitioned;
   determining an enabling value is associated with the coding unit, wherein the enabling value is indicative of motion vector refinement, to at least one partition of the first partition or the second partition, that is additional to a base motion vector already applied to the at least one partition of the first partition or the second partition; and
   in accordance with the determination that the enabling value associated with the coding unit is indicative of the additional motion vector refinement:
   determining at least one motion vector difference value for the at least one partition of the first partition or the second partition, wherein the at least one motion vector difference value is based on at least one indicator, put into or removed from the bitstream, indicating one or more distance values and one or more direction values associated with a corresponding individual one of the at least one partition of the first partition or the second partition; and
   applying a prediction of the coding unit in accordance with the at least one motion vector difference value; and
   producing one of the encoded video or the decoded video.

2. The apparatus of claim 1, wherein the coding unit is geometrically partitioned in accordance with Geometric Partitioning Merge Mode.

3. The apparatus of claim 1, wherein applying the prediction of the coding unit in accordance with the at least one motion vector difference value comprises applying a same motion vector difference value to both the first partition and the second partition.

4. The apparatus of claim 1, wherein applying the prediction of the coding unit in accordance with the at least one motion vector difference value comprises applying a motion vector difference value only to a larger of the first partition or the second partition.

5. The apparatus of claim 1, wherein determining at least one motion vector difference value for at the least one partition of the first partition or the second partition is based on a respective enabling value associated with individual ones of the first partition and the second partition.

6. The apparatus of claim 5, wherein the at least one motion vector difference value is not determined for a particular partition of the first partition or the second partition in an instance in which an enabling value for the particular partition is indicative that motion vector difference is not to be used.

7. The apparatus of claim 1, wherein the at least one indicator comprises a first indicator indicating the one or more distance values and a second indicator indicating the one or more direction values associated with a corresponding individual one of the at least one partition of the first partition or the second partition.

8. A method comprising:
   performing a coding process for video, wherein the coding process is one of encoding video into e coded video for placement into a bitstream or decoding video using the bitstream to form decoded video, the coding process comprising:
   accessing a coding unit corresponding to the video partitioned into a first partition and a second partition, wherein the coding unit is geometrically partitioned;
   determining an enabling value is associated with the coding unit, wherein the enabling value is indicative of motion vector refinement, to at least one partition of the first partition or the second partition, that is additional to a base motion vector already applied to the at least one partition of the first partition or the second partition; and
   in accordance with the determination that the enabling value associated with the coding unit is indicative of the additional motion vector refinement:
   determining at least one motion vector difference value for the at least one partition of the first partition or the second partition, wherein the at least one motion vector difference value is based on at least one indicator, put into or removed from the bitstream, Indicating one or more distance values and one or more direction values associated with a corresponding individual one of the at least one partition of the first partition or the second partition; and
   applying a prediction of the coding unit in accordance with the at least one motion vector difference value; and
   producing one of the encoded video or the decoded video.

9. The method of claim 8, wherein the coding unit is geometrically partitioned in accordance with Geometric Partitioning Merge Mode.

10. The method of claim 8, wherein applying the prediction of the coding unit in accordance with the at least one motion vector difference value comprises applying a same motion vector difference value to both the first partition and the second partition.

11. The method of claim 8, wherein applying the prediction of the coding unit in accordance with the at least one motion vector difference value comprises applying a motion vector difference value only to a larger of the first partition or the second partition.

12. The method of claim 8, wherein determining at least one motion vector difference value for the at least one partition of the first partition or the second partition is based on a respective enabling value associated with individual ones of the first partition and the second partition.

13. The method of claim 12, wherein the at least one motion vector difference value is not determined for a particular partition of the first partition or the second partition in an instance in which a respective enabling value for the particular partition is indicative that motion vector difference is not to be used.

14. The method of claim 8, wherein the at least one indicator comprises a first indicator indicating the one or more distance values and a second indicator indicating the one or more direction values associated with a corresponding individual one of the at least one partition of the first partition or the second partition.

15. A computer program product comprising a non-transitory computer readable storage medium having program code portions stored thereon, the program code portions configured, upon execution, to cause an apparatus to perform the following:
  perform a coding process for video, wherein the coding process is one of encoding video into encoded deo for placement into a bitstream or decoding video using the bitstream to form decoded video, the coding process comprising:
  accessing a coding unit corresponding to the video partitioned into a first partition and a second partition, wherein the coding unit is geometrically partitioned;
  determining an enabling value is associated with the coding unit, wherein the enabling value is indicative of motion vector refinement, to at least one partition of the first partition or the second partition, that is additional to a base motion vector already applied to the at least one partition of the first partition or the second partition; and
  in accordance with the determination that the enabling value associated with the coding unit is indicative of the additional motion vector refinement:
    determining at least one motion vector difference value for the at least one partition of the first partition or the second partition, wherein the at least one motion vector difference value is based on at least one indicator, put into or removed from the bitstream, indicating one or more distance values and one or more direction values associated with a corresponding individual one of the at least one partition of the first partition or the second partition; and
    applying a prediction of the coding unit in accordance with the at least one motion vector difference value; and
    producing one of the encoded video or the decoded video.

16. The computer program product of claim 15, wherein the coding unit is geometrically partitioned in accordance with Geometric Partitioning Merge Mode.

17. The computer program product of claim 15, wherein applying the prediction of the coding unit in accordance with the at least one motion vector difference value comprises applying a same motion vector difference value to both the first partition and the second partition.

18. The computer program product of claim 15, wherein applying the prediction of the coding unit in accordance with the at least one motion vector difference value comprises applying a motion vector difference value only to a larger of the first partition or the second partition.

19. The computer program product of claim 15, wherein determining at least one motion vector difference value for at least one partition of the first partition and the second partition is based on a respective enabling value associated with individual ones of the first partition and the second partition.

20. The computer program product of claim 19, wherein the at least one motion vector difference value is not determined for a particular partition of the first partition or the second partition in an instance in which a respective enabling value for the particular partition is indicative that motion vector difference is not to be used.

21. The computer program product of claim 15, wherein the at least one indicator comprises a first indicator indicating the one or more distance values and a second indicator indicating the one or more direction values associated with a corresponding individual one of the at least one partition of the first partition or the second partition.

* * * * *